Feb. 5, 1935.  G. W. YOUNKMAN  1,990,445
STORAGE BATTERY
Filed June 22, 1931    3 Sheets-Sheet 1

INVENTOR
GEORGE W. YOUNKMAN
BY ATTORNEY
Bohleber & Ledbetter

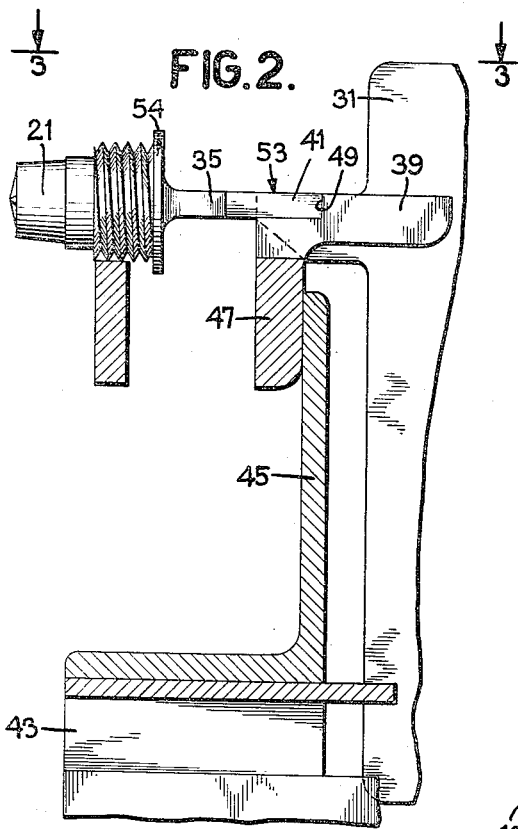
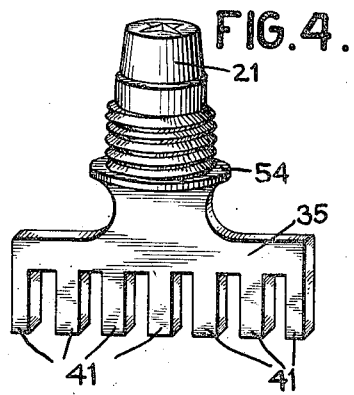
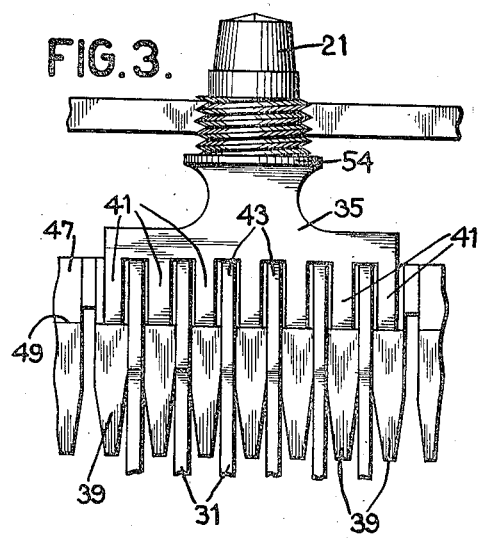
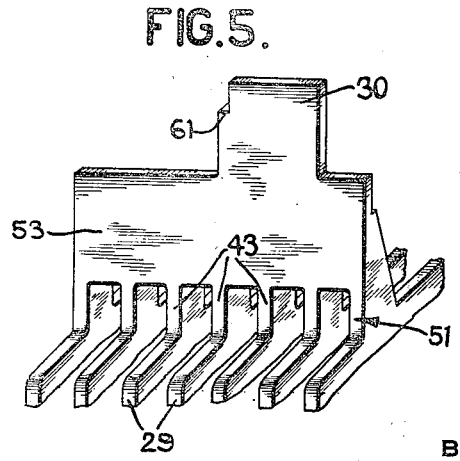
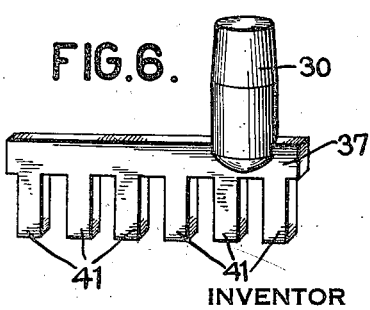

Feb. 5, 1935.　　　G. W. YOUNKMAN　　　1,990,445
STORAGE BATTERY
Filed June 22, 1931　　3 Sheets-Sheet 3

INVENTOR
GEORGE W. YOUNKMAN
BY ATTORNEY
Bohleber & Ledbetter

Patented Feb. 5, 1935

1,990,445

UNITED STATES PATENT OFFICE 1,990,445

STORAGE BATTERY

George W. Younkman, Brooklyn, N. Y., assignor to Bond Electric Corporation, Jersey City, N. J., a corporation of Delaware Application June 22, 1931, Serial No. 545,869

3 Claims. (Cl. 136—176)

This invention relates to storage batteries and more particularly, to the binding posts or terminals to which the grid plates are connected. In addition, the invention relates to the use of the terminals or the combs which form a part of the terminal as supporting structure for a cover by means of which each cell of the battery is closed and sealed.

An object of the invention is to devise a new binding post or terminal which may be easily and quickly secured to a plurality of plates of one polarity and which can be manufactured with a minimum of metal and a minimum of defective terminals.

A further object of the invention is to provide a construction for supporting the cover of the cell of a storage battery from a bridge member or from the comb carried by the terminal.

These and other objects of the invention and the means for their attainment will be more apparent from the following detailed description taken in connection with the accompanying drawings illustrating various embodiments by which the invention may be realized and in which:

Figure 2 is a view in side elevation and partly in section showing a frame by which a binding post or terminal may be posted or positioned with respect to a plurality of grid plates preparatory to securing the same together.

Figure 3 is a view showing the binding post and plates, looking from the top of Figure 2, on the line 3—3 of that figure.

Figure 4 is an elevational view showing a binding post constructed in accordance with this invention.

Figure 5 shows a modified form of binding post.

Figure 6 shows still another view of a somewhat different construction of connection for the terminal or binding post.

Figure 1:
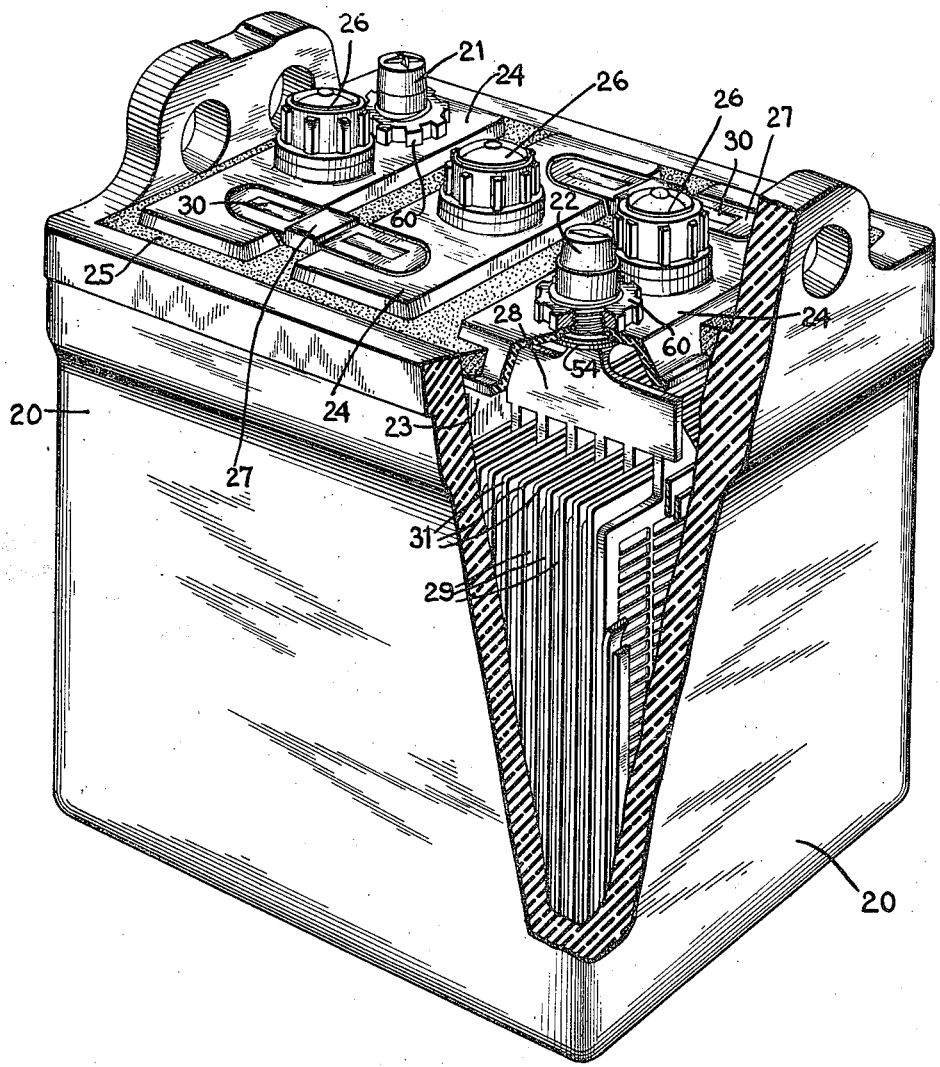
Figure 1 is a view showing a storage battery in perspective with certain parts removed and in section in the interest of clearness.
Figure 7:
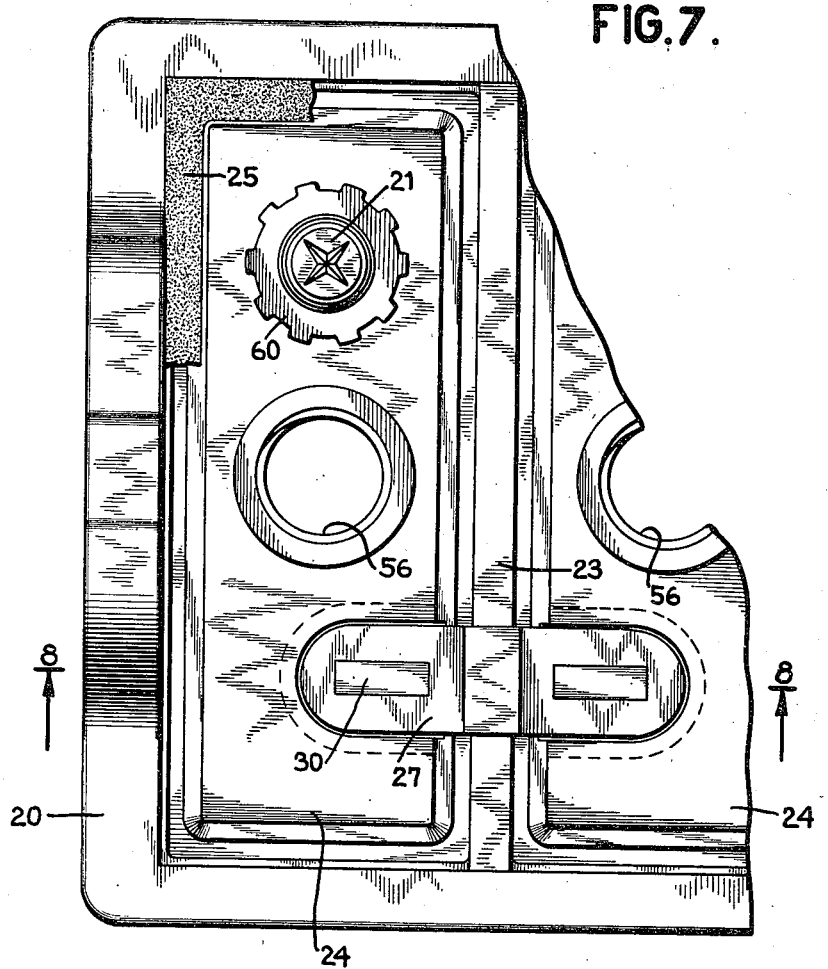
Figure 7 is a fragmentary plan view looking from above in Figure 1 and showing the devices for connecting the terminals of opposite polarity and of adjacent cells within the storage battery.
Figure 8:
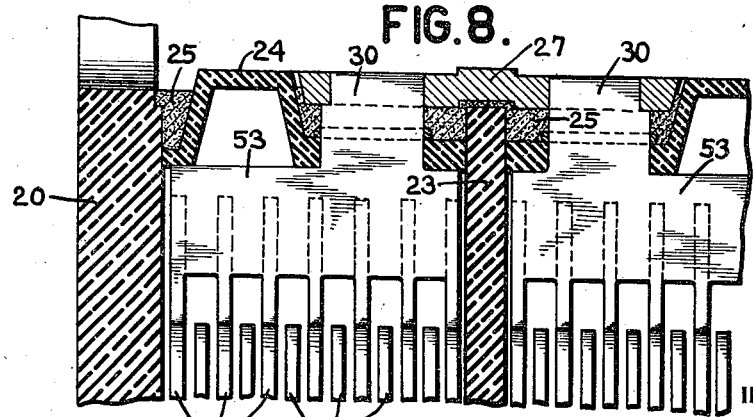
Figure 8 is a sectional view of the battery taken through the terminal on the line 8—8 of Figure 7 and looking in the direction of the arrows.

Referring now to the drawings, the storage battery comprises the usual casing 20 containing, for example, three cells. The battery has connecting terminals of opposite polarity located in a multicellular battery, such as that shown herein, in remote cells, such as the terminals 21 and 22 of Figure 1, which are the positive and negative terminals respectively of the battery. The battery casing 20 is subdivided into three cells by the walls 23, and each cell is adapted to be enclosed by a cover or cover member 24. The covers 24 for each cell are supported at the top of the cell by structure which will be described and the joints sealed by a material such as heated pitch 25 poured thereabout which hardens to form a moisture and air tight seal.

Each of the covers for the respective cells is provided with an opening closed by a removable cap 26 through which acid and/or distilled water may be introduced, as will be understood. The three cells of the battery shown may be connected in series by connecting terminals of opposite polarity in adjacent cells by means of a connecting strip 27. Each terminal of each cell is electrically connected to a plurality of plates as will be described in greater detail hereinafter. The negative terminal 22 is connected by a bridge member 28 to a plurality of negative plates 29, while the positive terminal 30 of that cell is similarly connected to a plurality of spaced positive plates 31, the plates being immersed, as will be understood, within an electrolyte contained within the cell defined by the outer walls of the casing 20 and the partitions 23. The positive and negative grid plates 29 and 31 are separated from each other by a wooden spacer as is known to the art.

The terminal of a battery is customarily secured to a plurality of grid plates by burning them to a comb which is held above the grid plates. Frequently the melted lead runs down between the plates and adheres thereto forming so-called rundowns. These must all be removed before further manufacture of the batteries can proceed. By the construction of the terminals of this invention and by the method used in burning the terminals to the grid plates, these rundowns between the plates are avoided. The terminal construction in addition requires less lead and the loss through defective terminals is largely if not entirely eliminated. The terminals of this application practically fall out of the molds without the use of ejectors although they are provided, whereas it frequently happens with the terminals now in use that the ejector bends the soft metal when still hot or otherwise damages them so that they are not usable. Then too, the terminals can be molded faster and the molding dies are cheaper and simpler all of which results in a material saving in the manufacture of storage batteries.

In accordance with the present invention, a terminal 21 shown in Figure 3, or terminal 30 shown in Figure 6, includes or carries a bridge member 35 or 37 respectively and preferably is cast integral therewith. The bridges carry teeth 41 forming a comb which is in a plane passing through the longitudinal axis of the connecting portion of the terminal.

A plurality of grid plates 29 or 31 each having a projection 43 extending outwardly from the edge thereof, are secured to the bridge or comb of the terminal. This is accomplished by inserting the projection of a grid plate in each space between two teeth of the comb and securing them therein such as by burning with the addition of metal from a stick of terminal material or merely by fusing the parts together. Hereinafter the word burning will be used to include burning or fusing or both. The grid plates 29 and 31 become thereby an integral part of the terminal and the bridge or comb becomes a broad rectangular bridge such as the bridge 53 in Figure 5. Incidentally the bridge 37 may carry the first and last teeth of the comb spaced from the ends thereof so that the projection 43 of a grid plate may be positioned at the end of the comb and burned there. With this type of comb, a grid plate is carried at the extreme ends of the bridge as shown in the form of terminal shown in Figure 5.

The form of terminal shown and described herein enables the terminal and the plurality of grid plates to be joined together by burning or fusing with the elimination of an operation in the process of manufacture. In the usual terminal having an offset comb, the grid plates were positioned with the lug or projection extending upwardly so that the burning or fusing takes place above the plates. Molten metal frequently runs down from the comb in between and sticks upon the grid plates forming so-called rundowns which must be removed since they otherwise would cause short circuits, prevent the insertion of the wooden spacers or cause some other unsatisfactory condition. With the terminals described herein, the grid plates are placed on end with the lug or projection 43 extending outwardly from the side of the plate as shown in Figure 2, in which position rundowns between the plates cannot occur since the fusing or burning operation is not over the plates. Any rundowns which do occur are only pencils hanging down from the lower side of the projections 43 which are not detrimental and may be readily removed because they are easily reached and do not have grid plates to stick to.

The method by which the terminals are burned to the grid plates or rather to the projections of the plates, is shown in Figure 2 with the devices which are used to support the terminal and the plates during the burning operation. A series of plates 31 shown partly in outline in Figure 3, are set upright or upon their sides in desired parallel relationship and at the desired spacing which is fixed by placing the plates between spacing members such as formed by the teeth of a comb-like frame 39. A second comb-like frame 41 as it may be called, is shown in Figure 2 mounted in any convenient fashion upon a frame member 43 which comb-like frame spaces the lower ends of the plates at the proper distance apart so that the plates are guided at both ends while being burned.

Extending upwardly, i. e., toward the operator, is an angle member or support 45 upon the forward end of which is mounted another angle member 47 slotted at a plurality of points to form the spacing teeth 39. The angle 47 is also rabbetted or has a recess 49 within which the comb 35 or 37 of the terminal is positioned with the ends of the teeth abutting the end of the recess and with the teeth 41 of the terminal comb positioned upon the spacing teeth 39. The upstanding projections 43 formed on the respective plates are then inserted between the teeth 39 and 41 and are in position to be burned permanently to the terminal comb. These projections or lugs 43 may extend upwardly with a vertical face 51, Figure 5, and the supporting angle 47 being so positioned that one face 53 of the terminal comb such as the comb 21, will lie in the plane of the faces 51 of the projections 43. When the parts are thus positioned, as shown in Figure 2, the terminal comb 35 may be united to the series of grid plates 31 or to the projections 43 carried thereby by a simple burning or fusing operation, i. e., by use of a torch over the faces 51 and 53, thereby causing the material to melt and flow and uniting them into an integral structure such as shown in Figure 5. It will be obvious that the method of securing the plates to the terminal is the same whether a terminal such as shown in Figure 4, Figure 5 or Figure 6 is used.

The sides of each cell of the battery are customarily smooth and a cover 24 is inserted therein to close the cell after the plates and other parts are placed in the cells. Because of the smooth side walls, the cover is usually supported upon the collar 54 of the connecting portion of the terminal as shown in Figure 1. With the construction of comb and terminal described herein, the cover is supported at its edges upon the bridge extending across the cell and carried by the terminal. Although this bridge forms part of the comb and its use as a support gives the comb a double purpose or function, it is clear that any means carried by the terminal for supporting the edges of the cover 24 is within the province of the invention.

The cover 24 may be cast of some non-metallic and insulating material such as hard rubber or the like. As is usual, the cover is formed with a top wall and downwardly depending side walls which are flanged at their bottom, the flanged bottoms resting upon the bridge or comb of the terminal. The cover 24 has a central aperture 56 through which the electrolyte and distilled water is poured. The cover also has apertures adjacent each end thereof through which the terminals of the cell project for connection with a cable or with the terminal of an adjacent cell.

The terminal may have a connecting portion of any desired form as shown in Figures 4, 5 and 6. The threaded terminal of Figure 4 is the form used generally upon batteries. A threaded washer 60 engages the threads and tightens the terminal onto the cover 24. The terminal shown in Figure 6 with the cylindrical connecting portion 30 is used for the terminals which are connected to the terminals of adjacent cells. The end of the connecting portion is tapered in order to support a connecting link thereupon. The flat connecting portion of the terminal of Figure 5 is used for the same purpose as the cylindrical. This terminal carries a shoulder 61 for properly spacing the connecting links 27 thereupon. The taper of the connecting portion 30 of Figure 6 and the shoulder 61 of Figure 5 comprise means for supporting a connecting link thereupon. The connecting portion is a rectangular member having a thickness equal to that of the comb which form of terminal is readily molded or formed in any other manner.

Various modifications will occur to those skilled in the art in the configuration, composition and disposition of the various component elements going to make up the invention as a whole, as well as the application thereof to various purposes and no limitation is intended by the phraseology of the foregoing description or illustrations in the accompanying drawings except as indicated in the appended claims.

What is claimed is:

1. A method of securing a plurality of grid plates having upwardly extending projections to a terminal bridge having a comb in a plane parallel to the axis of the terminal, comprising positioning the plates upon their side edges in spaced relation with one side edge of the projections extending horizontally, supporting said terminal comb in a horizontal position with the projections between the respective teeth and soldering the projections and comb together on the horizontal surface formed thereby.

2. A method of securing a plurality of grid plates having outwardly extending projections to a terminal comb comprising positioning the plates upon their side edges in spaced relation with the projections extending horizontally, supporting said terminal having a comb in a horizontal position with a projection of a grid plate in each space in the comb, a face of the comb being upward, and soldering the projections and bridge together along said upper face.

3. A method of securing a plurality of grid plates having outwardly extending projections to a terminal comb comprising positioning the plates upon their side edges in spaced relation with corresponding edges of the projections extending horizontally, supporting the terminal in a horizontal position with the projection of a grid plate in each space in the comb, one face of the comb being upward and level with the horizontal edges of the projections, and soldering the projections and bridge together along said upper face.

GEORGE W. YOUNKMAN.